(12) United States Patent
Inoue et al.

(10) Patent No.: US 7,241,969 B2
(45) Date of Patent: *Jul. 10, 2007

(54) UMBILICAL-MEMBER MANAGING SYSTEM FOR INDUSTRIAL ROBOT

(75) Inventors: Toshihiko Inoue, Fujiyoshida (JP); Kazutaka Nakayama, Minamitsuru-gun (JP); Tomoyuki Motokado, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 90 days.

This patent is subject to a terminal disclaimer.

(21) Appl. No.: 11/076,904

(22) Filed: Mar. 11, 2005

(65) Prior Publication Data

US 2005/0199601 A1     Sep. 15, 2005

(30) Foreign Application Priority Data

Mar. 12, 2004   (JP)   .............................. 2004-071304

(51) Int. Cl.
*B23K 9/12*   (2006.01)
(52) U.S. Cl. .............................. 219/125.1; 219/137.9; 901/42
(58) Field of Classification Search ............. 219/125.1, 219/137.9; 901/42
See application file for complete search history.

(56) References Cited

U.S. PATENT DOCUMENTS

| | | | | |
|---|---|---|---|---|
| 4,539,465 | A * | 9/1985 | Bosna ...................... | 219/137.7 |
| 5,274,213 | A * | 12/1993 | Sartorio .................... | 219/125.1 |
| 6,335,510 | B1 * | 1/2002 | Carbines .................. | 219/125.1 |
| 7,105,771 | B2 * | 9/2006 | Inoue et al. ............. | 219/125.1 |
| 7,173,213 | B2 * | 2/2007 | Inoue et al. ............. | 219/125.1 |
| 2004/0144764 | A1 * | 7/2004 | Inoue et al. ............. | 219/137.9 |
| 2006/0000817 | A1 * | 1/2006 | Inoue et al. ............. | 219/125.1 |
| 2006/0104790 | A1 * | 5/2006 | Inoue et al. ................ | 414/737 |
| 2006/0104791 | A1 * | 5/2006 | Nihei et al. ................. | 414/737 |

FOREIGN PATENT DOCUMENTS

| | | | |
|---|---|---|---|
| DE | 297 20 048 | * | 3/1999 |
| DE | 29720048 U1 | | 4/1999 |
| DE | 201 13 950 | * | 11/2001 |
| DE | 201 13 950 U1 | * | 11/2001 |
| DE | 20113950 U1 | | 12/2001 |

(Continued)

OTHER PUBLICATIONS

European Search Report dated Jun. 30, 2005.

*Primary Examiner*—Kevin P. Kerns
(74) *Attorney, Agent, or Firm*—Drinker Biddle & Reath LLP

(57) ABSTRACT

An umbilical-member managing system for an industrial robot. The embodiment of the umbilical-member managing system provided in an arc welding robot serves to lay and manage, along a manipulator, a torch cable connected to a welding torch attached to the manipulator. This umbilical-member managing system includes a support unit provided on the manipulator movably toward and away from the welding torch to support the torch cable; and a biasing mechanism continually biasing the support unit on the manipulator in a direction away from the welding torch. In this arrangement, the support unit may be composed of a wire feeding device for feeding a welding wire in the torch cable toward the welding torch. A guide unit is provided on the manipulator, which can guide the wire feeding device in a direction toward and away from the welding torch.

3 Claims, 7 Drawing Sheets

FOREIGN PATENT DOCUMENTS

| | | |
|---|---|---|
| EP | 1083030 A2 | 3/2001 |
| JP | 05-060669 | 3/1993 |
| JP | 5-28563 | 4/1993 |
| JP | 2001-150382 | 6/2001 |
| JP | 2001-179443 | 7/2001 |
| JP | 2002-166386 | 6/2002 |

* cited by examiner

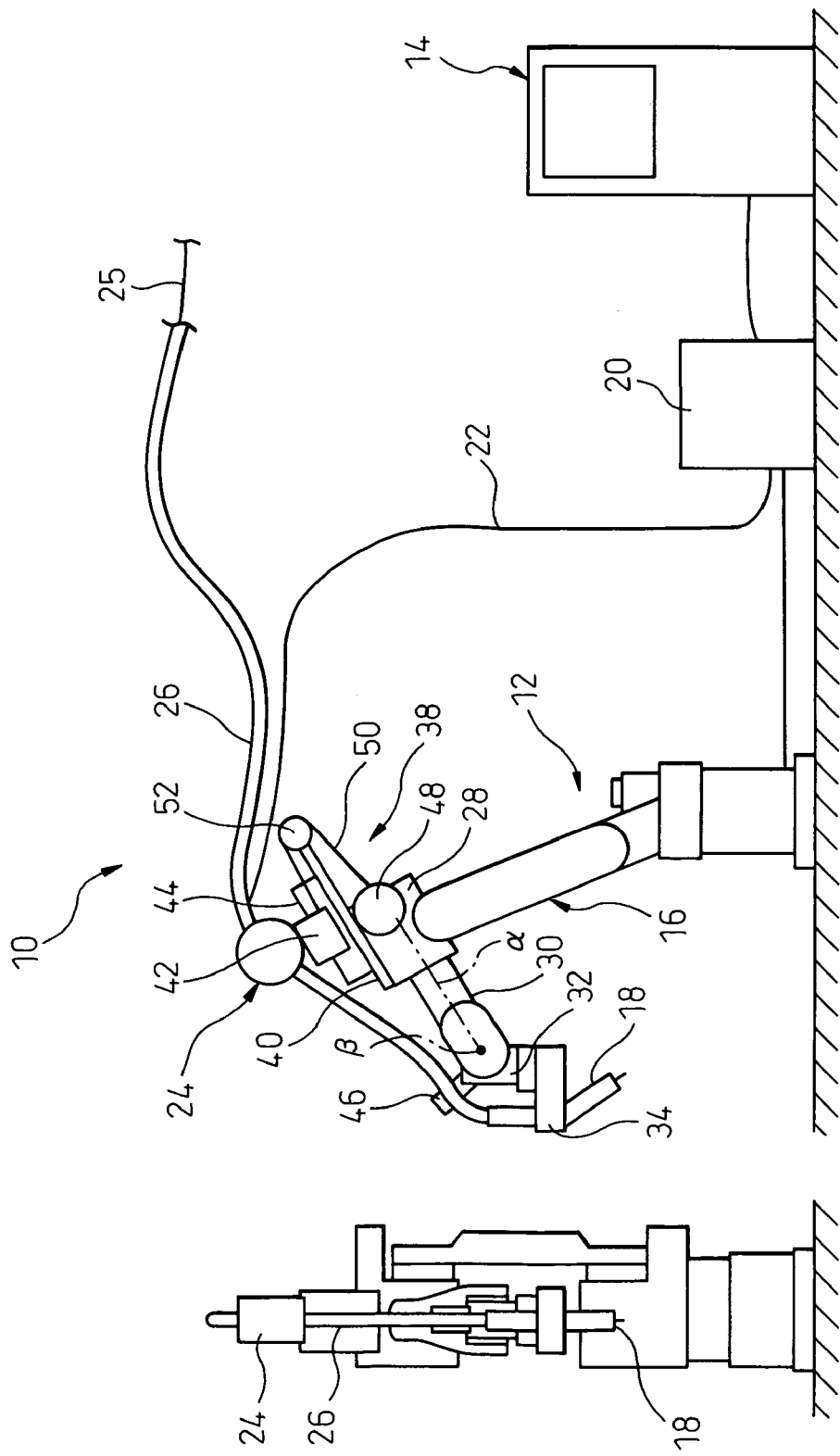

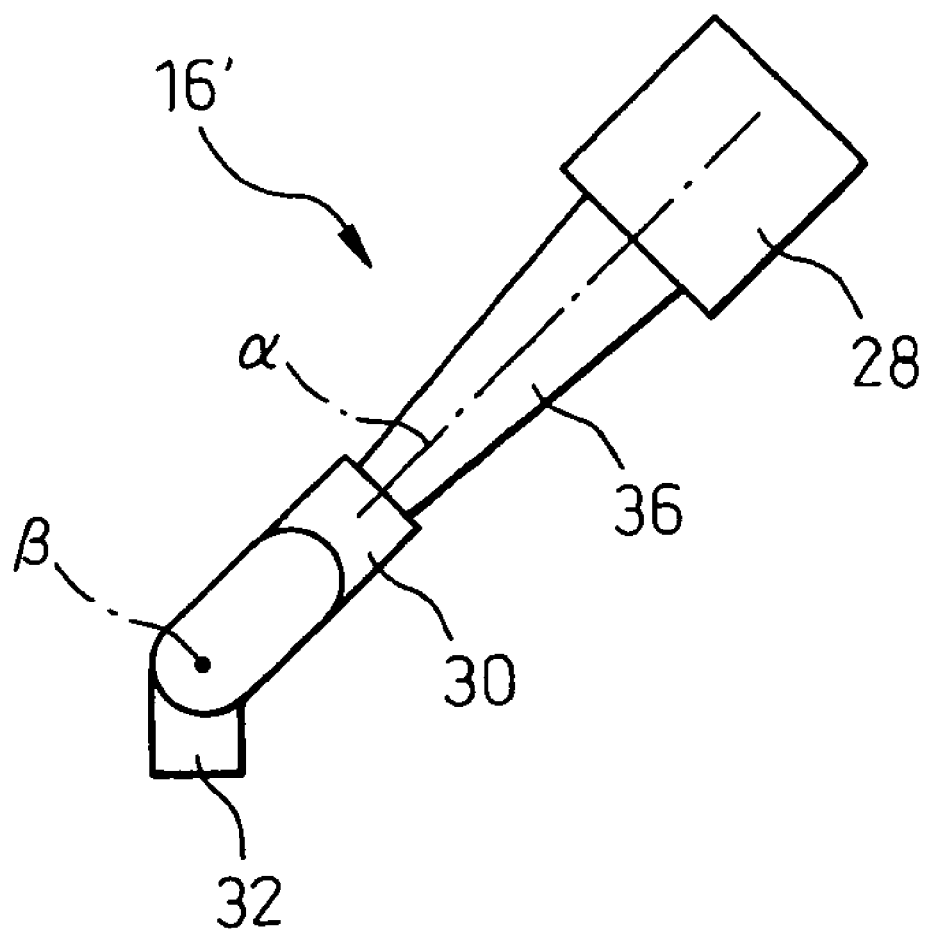

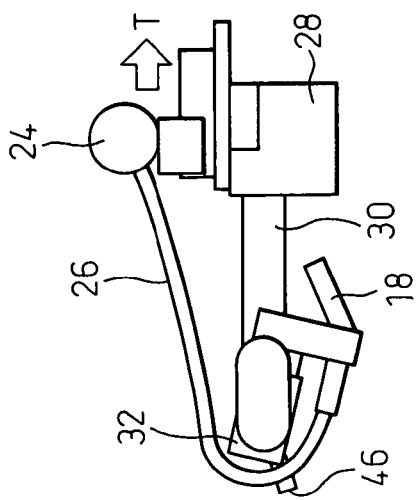
Fig. 4A  ORIENTATION 1
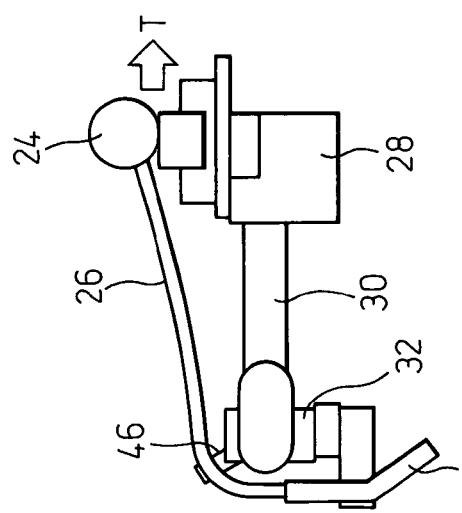
Fig. 4B  ORIENTATION 2
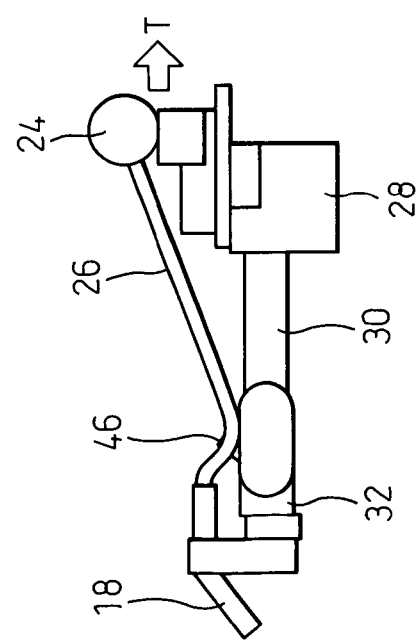
Fig. 4C  ORIENTATION 3

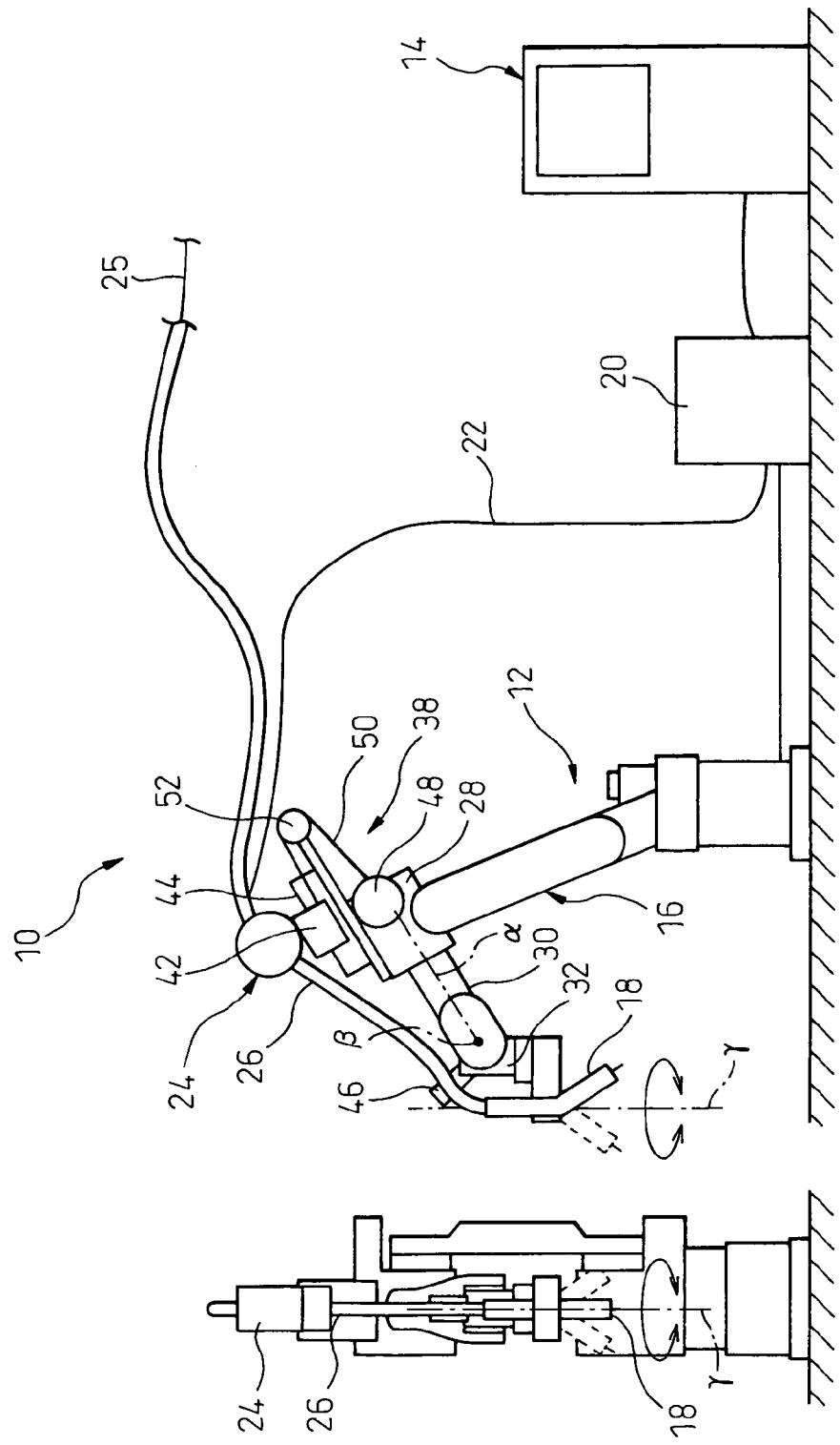

UMBILICAL-MEMBER MANAGING SYSTEM FOR INDUSTRIAL ROBOT

BACKGROUND OF THE INVENTION

1. Field of the Invention

The present invention relates to an umbilical-member managing system for an industrial robot. The present invention may be applied, for example, to a system for laying and managing a torch cable in an arc welding robot.

2. Description of the Related Art

Typically, an industrial robot is used in a condition where a working tool (i.e., an end effector) is attached to the distal end of a wrist. Electrical energy, an electric signal and/or a substance such as a gas or a liquid are supplied to the working tool through a cable, a pipe, etc. For example, in a welding robot with a welding torch mounted thereon as a working tool, a welding wire is supplied to the welding torch through a torch cable. In the present application, a member such as a cable, a pipe, etc., used for supplying energy, a signal, a substance (including a welding wire), or the like, to a working tool, is generally referred to as an "umbilical member".

At a site where an industrial robot (hereinafter simply referred to as a "robot") is used, various objects such as a workpiece, a jig, peripheral equipment, etc., are present around the robot, so that the robot often has to be operated to insert the working tool into a narrow space between such various objects. In this case, the arm, the wrist and the working tool, provided at the distal end of the robot, can operate in a relatively narrow space, which substantially eliminates a problem of interference between them and surrounding objects. However, it is very difficult to lay and manage the above-described umbilical member for the working tool without giving rise to interference with the surrounding objects. From a requirement for ensuring a minimum radius of curvature, the umbilical member is usually laid in a gently curved form, and as a result, the operational space of the robot is enlarged, which leads to a problem of interference with the surrounding objects. In other words, in the conventional configuration, the umbilical member is liable to interfere with objects such as a workpiece, a jig or peripheral equipment.

Conventionally, several techniques have been proposed in order to overcome the problem of interference of an umbilical member with surrounding objects. For example, Japanese Unexamined Utility Model Publication (Kokai) No. 5-28563 (JP 5-28563 U) discloses an arc welding robot requiring a welding wire to be supplied to a welding torch, in which a wire feeding device is mounted on a support base provided in a robot arm. FIGS. 1A and 1B schematically show the configuration of this arc welding robot, in which FIG. 1A is a front view showing the entire configuration of the welding robot, and FIG. 1B is a side view showing the distal end region of the arm of the welding robot as seen from the left side of FIG. 1.

As shown in FIG. 1A, in this arc welding robot, a welding torch 2 is attached to the distal end of a wrist of a robot mechanical section 1, and a wire feeding device 4 is mounted on a support base 5 of a robot arm (forearm) for feeding a welding wire to the welding torch 2 through a torch cable 3. The wire feeding device 4 is constructed so as to be adjustable in reciprocating motion (or slidable) along the feeding direction of the welding wire, through a shift unit (or a slide mechanism) 6 adapted to be controlled for the position thereof by a control section (not shown) for the robot arm. Thus, even when the wrist or the arm moves to some extent, the wire feeding device 4 is displaced and, thereby, the tension applied to the torch cable is reduced.

However, when a wrist axis provided in the robot performs an orientation change (i.e., a turning) of the welding torch 2, the behavior of the torch cable 3 exhibits a large change, as shown by broken lines 3a, 3b in FIG. 1B, due to the turning motion of the welding torch 2 (see broken lines 2a, 2b), which increases the possibility of interference between the torch cable 3 and surrounding objects. The torch cable 3 may also be excessively pulled and thus be entangled with the forearm, or the torch cable 3 may be excessively loosened and thus be significantly changed in curvature thereof (i.e., radius of curvature). This arises because the turning axis of the wrist is located to intersect with the distal end of the forearm, and because the torch cable 3 is supported by a support stay 7 extending from the support base 5 at a position above the turning axis of the wrist.

As an alternative technology, Japanese Unexamined Patent Publication (Kokai) No. 2001-179443 (JP 2001-179443 A) discloses a support structure for a wire feeding device used for feeding a welding wire to a welding torch in a welding robot, wherein the wire feeding device is slidably supported on a support unit provided on the ceiling, etc., of a building so as to be permitted to follow the movement of the welding torch. Also, Japanese Unexamined Patent Publication (Kokai) No. 2002-166386 (JP 2002-166386 A) discloses a guide unit for guiding a cable laid between several components of a robot, in which a guide rail in the shape of a circular arc is provided on the forearm of the robot, and a cable holder is attached rotatably to a runner movable along the guide rail.

As shown by way of example in FIGS. 1A and 1B, when the orientation of a working tool, such as a welding torch, attached to a distal end of a robot's wrist is to be changed, the working tool is usually turned relative to a robot arm (i.e., a manipulator). As a result, when the orientation of the working tool is changed during the operation thereof, an umbilical member, such as a cable or a pipe, for the working tool may be excessively pulled, or may be excessively loosened to significantly change the curvature thereof. Under the excessive pulling, the umbilical member may be entangled with the forearm. Alternatively, due to the excessive loosening, the umbilical member may interfere with surrounding equipment. Further, it is difficult in practice to simulate such a complicated behavior of the umbilical member, which prevents an operating program of the robot operation from being prepared in an off-line process.

SUMMARY OF THE INVENTION

It is therefore an object of the present invention to provide an umbilical-member managing system for an industrial robot, in which it is possible to automatically adjust a support position for supporting an umbilical member on a manipulator, in response to a orientation change of a working tool attached to a wrist, and thereby it is possible to effectively prevent the umbilical member from being excessively pulled or loosened, and to perform off-line programming while simulating the behavior of the umbilical member.

In order to accomplish the above object, the present invention provides an umbilical-member managing system for laying and managing, along a manipulator, an umbilical member connected to a working tool attached to the manipulator, comprising a support unit provided on the manipulator movably toward and away from the working tool to support the umbilical member; and a biasing mechanism continually biasing the support unit on the manipulator in a direction away from the working tool.

The umbilical-member managing system as described above may further comprise a guide unit provided on the manipulator, the guide unit being capable of guiding the support unit in a direction toward and away from the working tool.

In this arrangement, the support unit may include a support member securely fitted to the umbilical member; and the guide unit can guide the support member in the direction toward and away from the working tool.

Also, the working tool may comprise a welding torch; the umbilical member may include a welding wire to be fed to the welding torch; the support unit may comprise a wire feeding device for feeding the welding wire in the umbilical member toward the welding torch; and the guide unit can guide the wire feeding device in a direction toward and away from the welding torch.

The manipulator may include a forearm having a first longitudinal axis, a first wrist element rotatably joined to the forearm at the first axis, and a second wrist element rotatably joined to the first wrist element at a second axis extending generally perpendicularly to the first axis; the support unit may be provided on the forearm; and the working tool may be attached to the second wrist element.

In this arrangement, the working tool may be rotatably attached to the second wrist element at a third axis extending at a position spaced from the second axis in a direction generally perpendicular to the second axis.

The biasing mechanism may comprise a tension generating device provided on the forearm to bias the support unit away from the working tool and to apply tension to the umbilical member.

In this arrangement, the biasing mechanism may further comprise a traction wire transmitting a power of the tension generating device to the support unit, and a pulley provided on the forearm to direct the traction wire along the forearm.

In the above configuration, the umbilical-member managing system may further comprise an umbilical-member holder provided on the second wrist element to hold a portion of the umbilical member movably at a location close to the second axis.

BRIEF DESCRIPTION OF THE DRAWINGS

The above and other objects, features and advantages of the present invention will become more apparent from the following description of preferred embodiments in connection with the accompanying drawings, wherein:

FIG. 2A is a front view schematically showing an entire configuration of an industrial robot, in which an umbilical-member managing system according to an embodiment of the present invention is used;

FIG. 2B is a schematic side view showing a mechanical section of the robot of FIG. 2A;

FIG. 3 is a schematic front view showing a modification of a forearm and a wrist in the robot of FIG. 2A;

FIGS. 4A to 4C are schematic front views respectively showing, in different orientations of a working tool, the behavior of an umbilical member in response to the motion of a wrist in the robot of FIG. 2A;

FIG. 5A is a front view schematically showing an entire configuration of another industrial robot, in which an umbilical-member managing system according to an embodiment of the present invention is used;

FIG. 5B is a schematic side view showing a mechanical section of the robot of FIG. 5A;

DETAILED DESCRIPTION

Figure 1A:
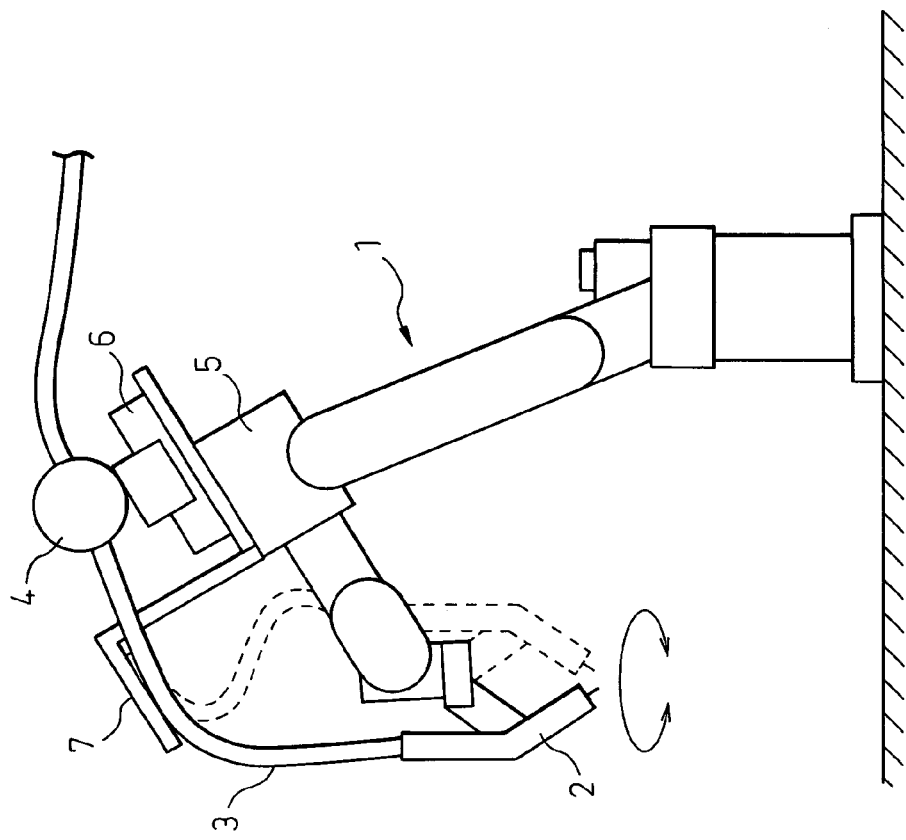
FIG. 1A is a front view schematically showing a mechanical section of a robot, in which a conventional umbilical-member managing system is used.
Figure 1B:
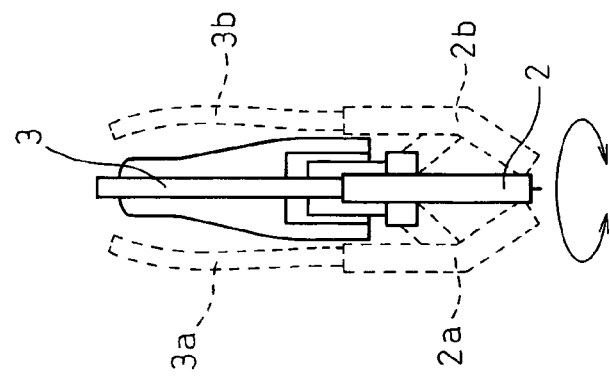
FIG. 1B is a side view showing an area around the wrist of the robot mechanical section of FIG. 1A.

The embodiments of the present invention are described below, in detail, with reference to the accompanying drawings. In the drawings, the same or similar components are denoted by common reference numerals.

Referring to the drawings, FIGS. 2A and 2B schematically show the configuration of an industrial robot in which an umbilical-member managing system 10 according to an embodiment of the present invention is used. In the illustrated embodiment, the umbilical-member managing system 10 is applied to an arc welding robot, in which the working tool comprises an arc welding torch and the umbilical member comprises a torch cable. However, the present invention is not limited thereto, but a system similar to the embodiment described below can be applied to a robot with another working tool mounted thereon, in laying and managing various umbilical members for supplying required energy, a signal, a substance, or the like, to the working tool. Although, in the illustrated embodiment, an application to a vertically articulated robot having a six-axes configuration is described by way of example, a similarly-configured umbilical-member managing system 10 can also be applied to a vertically articulated robot having a different (e.g., five-axes) configuration. The umbilical member can also be laid in a form contained in a conduit (not shown).

As shown in FIGS. 2A and 2B, an industrial arc-welding robot having an umbilical-member managing system 10 applied thereto includes a mechanical section 12 with a six-axes degree of freedom, and a robot controller 14 for controlling each axis of the mechanical section 12. The mechanical section 12 includes a robot arm or manipulator 16 having a wrist (as described later), and a welding torch 18 is attached, as a working tool (i.e., end effector), to the wrist of the manipulator 16. The mechanical section 12 operates to shift the welding torch 18 attached to the distal end of the wrist to a target position while keeping a designated orientation, in accordance with a command issued from the robot controller 14, so as to make the welding torch follow a joint of an object to be welded. To this end, servo-motors (not shown), provided respectively for the six axes of the mechanical section 12, are connected to and controlled by the robot controller 14 through a cable for control use (not shown).

The arc welding robot as illustrated further includes a welding power supply 20 for carrying out a welding operation by the welding torch 18. The robot controller 14 also issues a welding command to the welding power supply 20 simultaneously with an operation command to the servo-motor of each axis of the mechanical section 12. The welding power supply 20 is connected through a feeder cable 22 to a wire feeding device 24 provided on the manipulator 16 in a manner to be described later. The wire feeding device 24 supports a torch cable 26 on the manipulator 16 in a manner as described later, the torch cable 26 constituting an umbilical member containing a welding wire 25 to be fed to the welding torch 18, and operates to feed the welding wire 25 delivered from a not-shown welding-wire drum toward the welding torch 18 through the torch cable 26. The feeder cable 22 is introduced to the interior of the torch cable 26 at the wire feeding device 24, and is electrically connected to the welding wire 25 at the interior of the welding torch 18. The welding power supply 20 applies welding voltage and welding current, under the control of the robot controller 14 synchronously with the operation of the mechanical section 12, through the feeder cable 22 to the welding wire 25 dispensed from the distal end of the welding torch 18.

The manipulator 16 includes a forearm 28 having a first longitudinal axis α, a first wrist element 30 joined to the forearm 28 rotatably about the first axis α, and a second wrist element 32 joined to the first wrist element 30 rotatably about a second axis β extending in a direction generally perpendicular to the first axis α. The welding torch 18 is attached through an attachment member 34 to the second wrist element 32 at a position somewhat spaced from the second axis β oppositely to the forearm 28. In this connection, depending upon the configuration of a robot (or a mechanical section), a manipulator 16' having another configuration, as shown in FIG. 3, may be used. The manipulator 16' further includes a tapered extension 36 extending from the forearm 28 in the direction of the first axis α, in which the first wrist element 30 is joined to the extension 36 in a manner rotatable about the first axis α and the second wrist element 32 is joined to the first wrist element 30 in a manner rotatable about the second axis β.

The umbilical-member managing system 10, applied to the arc welding robot having the above configuration, serves for laying and managing the torch cable 26 along the manipulator 16, with the torch cable being connected to the welding torch 18 attached to the manipulator 16, and includes a support unit (a wire feeding device 24, in the illustrated embodiment) provided on the manipulator 16 movably in directions toward and away from the welding torch 18 so as to support the torch cable 26, and a biasing mechanism 38 continually biasing the support unit (or the wire feeding device 24) on the manipulator 16 in a direction away from the welding torch 18.

A mounting substrate 40 is formed on the forearm 28 of the manipulator 16, and a guide unit (i.e., a slide mechanism) 44 including a slider 42 reciprocally movable along a guide rail, in a direction generally parallel to the first axis α, is provided on the mounting substrate 40. The wire feeding device 24 is mounted on the slider 42 of the guide unit 44 so as to be supported on the forearm 28, and is guided in a direction selectively toward and away from the welding torch 18 (or in a direction generally parallel to the first axis α) in a sliding fashion, while supporting the torch cable 26 and being integrally with the slider 42. As will be described later, in some case, a freedom for a swinging motion may be given to the slider 42 (or to the guide unit 44 in its entirety) in addition to a freedom in the direction generally parallel to the first axis α.

A cable holder 46 is provided at a suitable location on the second wrist element 32 to hold a portion of the torch cable 26 inserted therethrough and movable in the longitudinal and rotating directions. The torch cable 18 extends to the welding torch 18 at a location close to the second axis β as a rotation center of the second wrist element 32, while being held movably on the cable holder 46. Consequently, the torch cable 26 having certain flexibility is allowed to be shifted smoothly in the longitudinal direction thereof along the forearm 28, during the sliding motion of the wire feeding device 24 as described later. In this connection, similar cable holders may be additionally provided, as occasion demands, at (one or more) suitable locations of the first wrist element 30 and/or the second wrist element 32, so as to improve the guiding function for the torch cable 26.

Further, in recent years, the size of the wire feeding device 24 has been reduced by using a servo-mechanism. When such a miniaturized wire feeding device 24 is incorporated, the wire feeding device 24 can be mounted on the first wrist element 30 so as to reduce the distance between the welding torch 18 and the wire feeding device 24, and to further improve the stability of the feed motion of the welding wire 25.

The biasing mechanism 38 includes a tension generating device 48 disposed at a suitable location on the forearm 28 and having a tension spring mechanism for elastically biasing the support unit (or the wire feeding device 24) away from the welding torch 18, a traction wire 50 for transmitting the elastically biasing spring force generated by the tension generating device 48 to the support unit (or the wire feeding device 24), and a pulley 52 disposed at a suitable location on the forearm 28 for directing the traction wire 50 along the forearm 28. The tension generating device 48 and the pulley 52 are spaced at a suitable distance from each other on the forearm 28 and are securely provided on the forearm 28.

The traction wire 50 is connected at one end to either the wire feeding device 24 or the slider 42, and at the other end to the tension generating device 48, and is wound around the pulley 52 at an intermediate length to be turned back therefrom. Consequently, a generally constant tension is always applied to the traction wire 50. Thus, the wire feeding device 24 is always subjected directly or indirectly to a force pulling the wire feeding device 24 in a direction away from the welding torch 18 along the first axis α.

When the tension generating device 48 of the biasing mechanism 38 exerts a traction force upon the wire feeding device 24 in the direction away from the welding torch 18 along the first axis α, a like force is applied to the predetermined length of the torch cable 26 extending from the wire feeding device 24 toward the welding torch 18. In other words, the torch cable 26 is supported movably by the guide unit 44 on the manipulator 16, indirectly through the wire feeding device 24, and is subjected to a suitable tension generated by the tension generating device 48. In this connection, various known devices may be employed as the tension generating device 48 as long as a generally constant tension can be generated. For example, a tension generating device including a compression spring mechanism in place of a tension spring mechanism may be used.

Also, in a certain application other than the arc welding robot, the umbilical member may be connected to the working tool without using any umbilical-member control device such as the wire feeding device 24. In this arrangement, a support member (e.g., the slider 42 as described above) securely attached to the umbilical member may be used as the support unit for supporting the umbilical member, so that the guide unit 44 slidably guides the support member (or the slider 42) in the direction as described above. Also in this arrangement, the traction wire 50 is connected at one end thereof to the support member, and the power (i.e., the biasing force) of the tension generating device 48 is applied through the support member to the umbilical member.

The following is an investigation into, in the umbilical-member managing system 10 having the above-described configuration, the behavior of the torch cable 26 and the accompanying positional change of the wire feeding device 24 at an instant when the orientation of the wrist (the first wrist element 30 and the second wrist element 32) of the manipulator 16 changes. As can be seen from the foregoing description, the wire feeding device 24 is subjected, in a complex manner, to a force (or gravity) due to the weight of the wire feeding device 24, a force (or traction force) from the biasing mechanism 38 which biases the wire feeding device 24 away from the welding torch 18, and a force (or gravity) due to the weight of the torch cable 26 which is applied by the torch cable 26 during the change in the orientation of the wrist. Therefore, the position of the wire feeding device 24 on the forearm 28, as seen in the direction of the first axis α, is determined by the balanced condition of the first-axis components of these forces.

Accordingly, it is possible to properly control the behavior of the torch cable 26 (e.g., to eliminate excessive loosening) by setting the traction force exerted by the tension generating device 48 upon the traction wire 50 (i.e., the spring force from the tension spring mechanism) at an appropriate level. More specifically, it is appropriate that the tension generating device 48 generates a traction force slightly greater than the total weight of the wire feeding device 24 and the torch cable 26. With this configuration, even if the forearm 28 droops due to a lowering operation of the wrist, it is possible to reliably prevent the wire feeding device 24 from being shifted on the forearm 28 toward the welding torch 18 due to the gravity exerted upon the wire feeding device 24 and the torch cable 26, which would otherwise excessively loosen the torch cable 26, in a condition where the minimum necessary load (or tension) is applied to the torch cable 26 by the biasing mechanism 38.

The mode of operation of the umbilical-member managing system 10 as described above will be further explained below with reference to FIGS. 4A to 4C. FIGS. 4A to 4C respectively show the laying states of the torch cable 26 when the second wrist element 32 changes the orientation (or the rotational position) thereof and thus the welding torch 18 represents orientations 1, 2 and 3. As can be seen from the drawings, even when the second wrist element 32 operates in rotation, from orientation 1 to orientation 2 and from orientation 2 to orientation 3, by a large angle (approximately 360 degrees), the appropriate traction force T is applied to the wire feeding device 24 by the tension generating device 48 (FIG. 2A) as described above, so that excessive loosening of the torch cable 26 between the holding member 46 and the wire feeding device 24 is eliminated and so that the excessive tension of the torch cable 26 resulting into entanglement with the forearm 28 or the first wrist element 30 is prevented.

Thus, in the umbilical-member managing system 10 as described above, the position of the wire feeding device 24 on the forearm 28 (i.e., the support position for the torch cable 26) is determined, depending upon the position and/or orientation of the second wrist element 32 (i.e., the welding torch 18), so that the laying form of the torch cable is stably maintained during the operation of the wrist. As a result, the interference between the excessively loosened torch cable 26 and the surrounding objects, as well as the entanglement of the excessively tensed torch cable 26 with the manipulator 16, which results in fatigue of the cable material, are effectively prevented. Also, because the behavior of the torch cable 26 does not significantly change during the change of orientation of the welding torch 18, it is possible to stably and continuously feed the welding wire 25.

Further, due to the fact that the posture of the torch cable 26 is made stable, it is possible to carry out the simulation of the behavior of the torch cable 26, which has been conventionally difficult due to large positional deviation and uncertainty. This is because the change in the posture of the torch cable 26 is small, which permits the posture of the torch cable 26 to be reproduced in a manner as to substantially linearly correspond to the orientation change of the wrist (in particular, the second wrist element 32). Therefore, it becomes possible to carry out off-line programming to simulate the operation of the arc welding robot including the behavior of the torch cable 26.

In the configuration as described above, the tension generating device 48 preferably includes an adjusting mechanism for adjusting the level of tension generated by the tension spring mechanism. The provision of such an adjusting mechanism makes it possible to apply an optimal traction force to the traction wire 50 in accordance with the weight, type, etc., of the wire feeding device 24 and the torch cable 26 as actually used and, thereby, to adjust the load (or tension) on the torch cable 26 to a minimum level so as to increase the life of the torch cable 26. Also, as an additional biasing mechanism 38, shock absorbers (not shown) may be provided at longitudinally opposite ends of the guide unit 44, so that it is possible to properly bias and support the slider 42 even when the tension of the tension generating device 48 is small.

Further, in place of the above-described configuration in which the slider 42 attached to the wire feeding device 24 is moved along the guide rail of the guide unit 44 fixed to the mounting substrate 40 in the direction of longitudinal (or first) axis of the forearm 28, another configuration may be employed wherein the guide rail of the guide unit 44 is movable on the forearm 28 along the first axis direction. In this arrangement, the position of the guide rail on the forearm 28 may be controlled under a command from the robot controller 14.

The umbilical-member managing system according to the present invention may be applied to another arc welding robot using a welding-torch support structure different from that in the above-described arc welding robot. An example of such an arc welding robot will be described below with reference to FIGS. 5A and 5B. This arc welding robot has substantially the same configuration as the arc welding robot shown in FIGS. 2A and 2B, except for the structure for attaching the welding torch 18 to the wrist of the manipulator 16. Therefore, corresponding components are denoted by common reference numerals and an explanation thereof is not repeated.

In the arc welding robot as illustrated, the manipulator 16 of the mechanical section 12 includes a forearm 28 having a first axis α, a first wrist element 30 joined to the forearm 28 rotatably about the first axis α, and a second wrist element 32 joined to the first wrist element 30 rotatably about a second axis β. The welding torch 18 is attached through an attachment member 34 to the second wrist element 32 rotatably about a third axis γ extending in a direction generally orthogonal to the second axis β at a position spaced from the second axis β. The turning motion of the welding torch 18 about the third axis γ is produced by, e.g., an actuator (not shown) incorporated in the second wrist element 32. This actuator may be controlled by the robot controller 14.

In the above configuration, it is possible to change the orientation of the welding torch 18 by turning the welding torch 18 about the third axis γ on the attachment member 34. In this connection, if the orientation of the welding torch 18 is changed the turning thereof about the third axis γ, the torch cable 26 may be twisted, and in order to prevent the torch cable 26 from being twisted, the joint portion of the torch cable 26 connected to the welding torch 18 is preferably structured to be rotatable relative to the welding torch 18.

In the arc welding robot having the above welding-torch support structure, an umbilical-member managing system 10 according to an embodiment of the present invention achieves operative effects equivalent to those as already described. Particularly, in this arc welding robot, when the welding torch 18 is turned about the third axis γ by the operation of the actuator, a positional deviation may be caused in the torch cable 26 following the turning motion. In this situation, if the torch cable is loosened to a large extent near the welding torch as in the prior art (JP 5-28563 U), the interference between the torch cable and surrounding objects may occur. On the contrary, according to the umbilical-member managing system 10, even when the welding torch 18 is turned about the third axis, the torch cable 26 is maintained in a properly tensioned state by the biasing action of the biasing mechanism 38 as described above. Therefore, the excessive positional deviation of the torch cable 26 following the turning motion of the welding torch 18 is avoided, and thus the interference of the torch cable with the surrounding objects is surely prevented. In this connection, such a positional deviation of the torch cable can be simulated with good reproducibility. Accordingly, similar to the configuration as already described, it is possible to perform off-line programming by simulating the operation of the arc welding robot including the behavior of the torch cable 26.

Figure 6A:
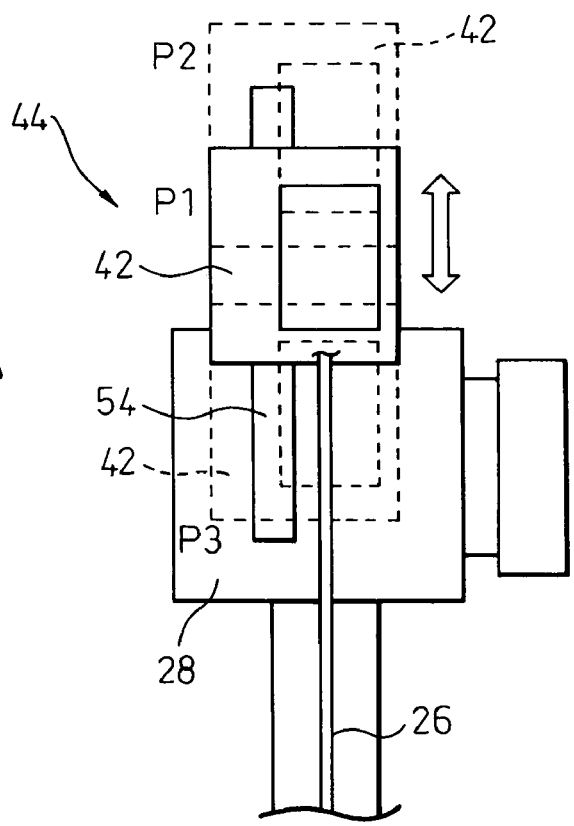
FIG. 6A is a partially enlarged plan view of the mechanical section of the robot of FIG. 2A, for explaining a shifting mode of an umbilical-member support unit on a forearm.
Figure 6B:
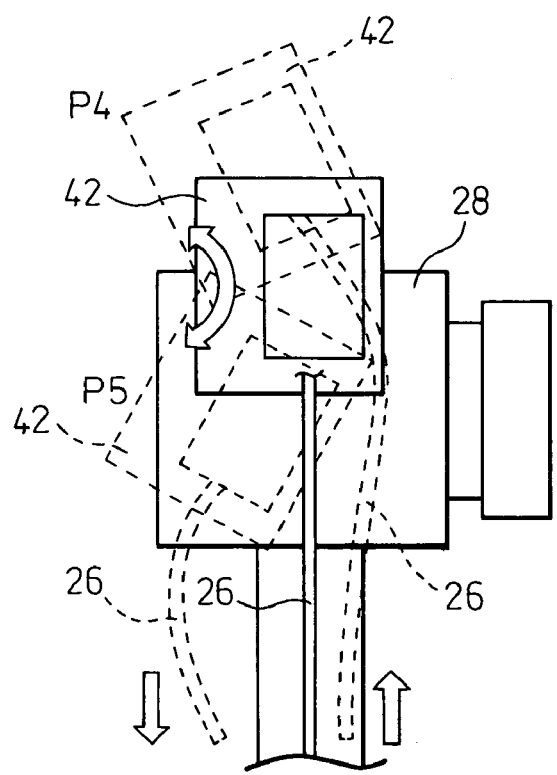
FIG. 6B is a partially enlarged plan view of the mechanical section of the robot of FIG. 2A, for explaining another shifting mode of the umbilical-member support unit on the forearm.

The configuration of the support unit and the biasing mechanism in the umbilical-member managing system according to the present invention will be described in a supplementary manner with reference to FIGS. 6A and 6B. FIGS. 6A and 6B schematically show the operation modes of the wire feeding device 24, as the support unit in the umbilical-member managing system 10 of the illustrated embodiment (FIG. 2A, FIG. 5A), on the forearm 28, wherein FIG. 6A shows the mode of a linear motion of the slider 42 attached to the wire feeding device 24, and FIG. 6B shows the mode of a swinging motion of the slider 42.

As shown in FIG. 6A, a linear guide rail 54 of the guide unit 44 (FIG. 2A, FIG. 5A) is securely provided on the forearm 28, and the slider 42 is structured to slide straight along the guide rail 54. Although the wire feeding device 24 is not illustrated, the torch cable 26 exerts, in a downward direction in the drawing, a force (by gravity) upon the slider 42 through the wire feeding device 24, as already described. On the other hand, a traction force, opposing gravity, on the torch cable 26 is exerted, in an upward direction in the drawing, through the wire feeding device 24 upon the slider 42 by the biasing mechanism 38 (FIG. 2A, FIG. 5A). The slider 42 is disposed on the guide rail 54 at a position P1 where these forces are balanced. When the orientation of the welding torch 18 (FIG. 2A, FIG. 5A) changes about the second axis β and/or the third axis γ as already described, the equilibrium point of these forces changes accordingly, and the slider 42 moves along the guide rail 54 to P2, P3 or another position. During this movement of the slider 42, the posture of the torch cable 26 hardly varies.

In the mode of the swinging motion as shown in FIG. 6B, a degree of freedom of the swinging motion, as illustrated, is given to the slider 42 by the structure of the guide unit 44 (FIG. 2A, FIG. 5A), in addition to the degree of freedom of a linear motion as described above (detail of the configuration is omitted). In the arrangement using such a swingable-type guide unit 44, when the orientation of the welding torch 18 (FIG. 2A, FIG. 5A) is changed about the second axis β and/or the third axis γ, the magnitude and direction of the force exerted upon the slider 42, indirectly from the torch cable 26, will change and the slider moves to P4, P5 or another position in a swinging mode, accordingly. In this arrangement, however, the position of the slider 42 in the vertical direction in the drawing is determined, in the same way as in the configuration in FIG. 6A, at the equilibrium point of the gravitational force of the torch cable 26 and the traction force of the biasing mechanism (FIG. 2A, FIG. 5A). Therefore, according to this arrangement, the posture of the torch cable 26 hardly changes during the change in the orientation of the welding torch 18.

Figure 7:
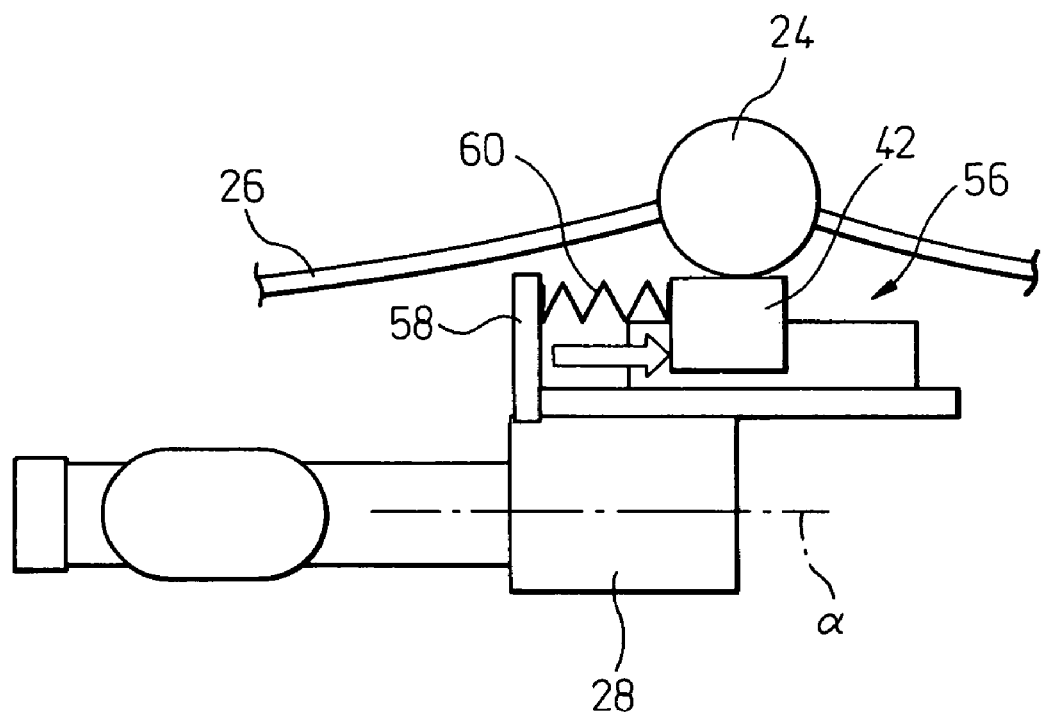
FIG. 7 is a partially enlarged front view of the mechanical section of the robot of FIG. 2A, showing a modification of an umbilical-member biasing mechanism provided on the forearm.

FIG. 7 shows the configuration of a tension generating device 56 using a compression spring mechanism, as an alternative to the tension generating device 48 using a tension spring mechanism as described above. The tension generating device 56 includes a compression-spring support 58 formed at a desired location near a wrist on the forearm 28, and a compression spring 60 interposed in a compression state between the compression-spring support 58 and the slider 42 (or the wire feeding device 24). The tension generating device 56 exerts a pressing force biasing the slider 42 (or the wire feeding device 24) on the forearm 28 in a direction generally parallel to the first axis α away from the welding torch 18 (FIG. 2A, FIG. 5A). Therefore, when the tension generating device 56 is used in place of the tension generating device 48 as described above, the same operative effect can be achieved.

As will be apparent from the foregoing description, according to the present invention, it is possible, for an umbilical-member managing system for an industrial robot, to automatically adjust a support position for supporting the umbilical member on a manipulator, in response to the orientation change of a working tool attached to a wrist, and thus to ensure the minimum radius of curvature allowed for the umbilical member, so as to effectively prevent the umbilical member from being excessively pulled or loosened. In the case of applying the present invention to an arc welding robot, it is possible to stably feed a welding wire, which allows a welding operation to be performed stably and, also, an increase in life of a torch cable to be expected. Further, uncertainty in behavior of the umbilical member is decreased, so that difficulties in preparing an operation program in an off-line system are eliminated. For example, in the case of an arc welding robot, the simulation of an arc welding operation, which has conventionally been considered to be difficult, is simplified, and an off-line programming becomes possible. As a result, it is possible to significantly reduce the time required for a teaching.

While the invention has been described with reference to specific preferred embodiments, it will be understood, by those skilled in the art, that various changes and modifications may be made thereto without departing from the spirit and scope of the following claims.

The invention claimed is:

1. An umbilical-member managing system for laying and managing, along a manipulator, an umbilical member connected to a working tool attached to said manipulator, comprising:

a support unit provided on said manipulator, said support unit being movable toward and away from said working tool to support said umbilical member;

a biasing mechanism continually biasing said support unit on said manipulator in a direction away from said working tool; and a guide unit provided on said manipulator, said guide unit being capable of guiding said support unit in a direction toward and away from said working tool;

wherein said working tool comprises a welding torch;

wherein said umbilical member includes a welding wire to be fed to said welding torch;

wherein said support unit comprises a wire feeding device for feeding said welding wire in said umbilical member toward said welding torch;

wherein said guide unit is capable of guiding said wire feeding device in a direction toward and away from said welding torch;

wherein said manipulator includes a forearm having a first longitudinal axis, a first wrist element rotatably joined to said forearm at said first axis, and a second wrist element rotatably joined to said first wrist element at a second axis extending generally perpendicularly to said first axis;

wherein said support unit is provided on said forearm;

wherein said working tool is rotatably attached to said second wrist element at a third axis extending at a position spaced from said second axis in a direction generally perpendicular to said second axis;

wherein said biasing mechanism comprises a tension generating device provided on said forearm to bias said support unit away from said working tool and to apply tension to said umbilical member; and wherein said biasing mechanism further comprises a traction wire transmitting a power of said tension generating device to said support unit, and a pulley provided on said forearm to direct said traction wire along said forearm.

2. An umbilical-member managing system as set forth in claim 1, wherein said support unit includes a support member securely fitted to said umbilical member; and wherein said guide unit is capable of guiding said support member in said direction toward and away from said working tool.

3. An umbilical-member managing system as set forth in claim 1, further comprising an umbilical-member holder provided on said second wrist element to movably hold a portion of said umbilical member at a location close to said second axis.

* * * * *